United States Patent [19]
Arrighetti et al.

[11] 3,725,372
[45] Apr. 3, 1973

[54] PROCESS FOR OBTAINING MODIFIED POLYETHYLENES AND CROSS-LINKED POLYETHYLENES HAVING HIGH MECHANICAL, CHEMICAL AND ELECTRIC CHARACTERISTICS, AND POLYETHYLENE OBTAINED

[75] Inventors: Sergio Arrighetti; Giorgio Corradini; Sebastiano Cesca, all of Milano, Italy

[73] Assignee: Snam Progetti S.p.A., Milan, Italy

[21] Appl. No.: 56,004

[30] Foreign Application Priority Data

July 18, 1969 Italy..................................19811 A/69

[52] U.S. Cl. ...............................................260/88.2 D
[51] Int. Cl. ................................................C08f 15/04
[58] Field of Search..............260/80.78, 88.2 D, 80.7

[56] References Cited

UNITED STATES PATENTS

| | | | |
|---|---|---|---|
| 3,222,331 | 12/1965 | Duck | 260/80.78 |
| 3,470,142 | 10/1965 | Sarton | 260/79.5 |
| 3,527,739 | 9/1970 | Valiamori | 260/80.78 |
| 3,453,250 | 7/1969 | Natta | 260/88.2 |
| 3,494,897 | 2/1970 | Reding | 260/78.5 |

*Primary Examiner*—James A. Seidleck
*Assistant Examiner*—Roger S. Benjamin
*Attorney*—Ralph M. Watson

[57] ABSTRACT

A polyethylene is disclosed that is modified by copolymerizing ethylene with a comonomer consisting of a minor quantity of a polycyclic polyene having at least three double bonds in the molecule, and preferably an endomethylenic bridge, so that it can be readily cross-linked under the influence of heat without the presence of an additive, but which still exhibits the characteristics of a conventional crystalline polyethylene.

6 Claims, No Drawings

PROCESS FOR OBTAINING MODIFIED POLYETHYLENES AND CROSS-LINKED POLYETHYLENES HAVING HIGH MECHANICAL, CHEMICAL AND ELECTRIC CHARACTERISTICS, AND POLYETHYLENE OBTAINED

The present invention relates to a process for obtaining a modified polyethylene, which can be cross-linked easily by thermal procedure without addition of any additives; to the cross-linked product obtained from the thus modified polyethylene; and to the processes for obtaining both the modified polyethylene and the cross-linked products.

It is known that in the past the cross-linking of the polyethylenes has been carried out by means of reactions with peroxides or by radiations; in such a manner the polyethylene, besides retaining the known characteristics of the crystalline polyethylenes, also acquires interesting features such as a high shock resistance and a higher deformation resistance under prolonged stresses and a good dimensional stability also beyond its melting point.

However the known polyethylenes obtained with the past processes present some drawbacks during subsequent technical treatment.

The first object of the invention is attained by copolymerizing ethylene with variable amounts of a suitable comonomer consisting of a polycyclic polyene obtaining thereby a modified polyethylene.

The second object of the invention is attained by means of a simple heat treatment of the above polyethylene under suitable conditions.

Finally the product obtained with said simple heat treatment, which presents all the excellent properties of the known cross-linked polyethylenes, constitutes as aforesaid the third object of the invention.

An advantage presented by the modified polyethylene according to the present invention consists in that it is possible to synthesize it with such a high molecular weight to be worked out and transformed by simple heating into a polyethylene having better characteristics than those previously obtainable from extremely high molecular weight polyethylenes, which among other things present difficulties when worked with (as the cross-linked ones).

The process according to the present invention is characterized in that the ethylene polymerization is carried out in the presence of a small amount of a polycyclic polyene having at least three double bonds in the molecule. The obtained copolymer, which presents the characteristics of a conventional crystalline polyethylene, when subjected to heating, gives rise to cross-linking yielding, depending on the molecular weight and the comonomer content, products whose molecular weight of increases until a tridimensional structure is obtained. The polycyclic polyenes having at least three double bonds in the molecule are advantageously but not restrictively selected from those which have at least an endomethylenic bond.

The double bond may be present both within the carbon atom ring and in the side chains.

More advantageously said polycyclic polyenes are selected from:

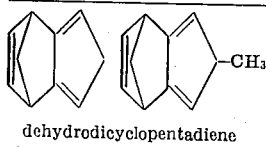

dehydrodicyclopentadiene

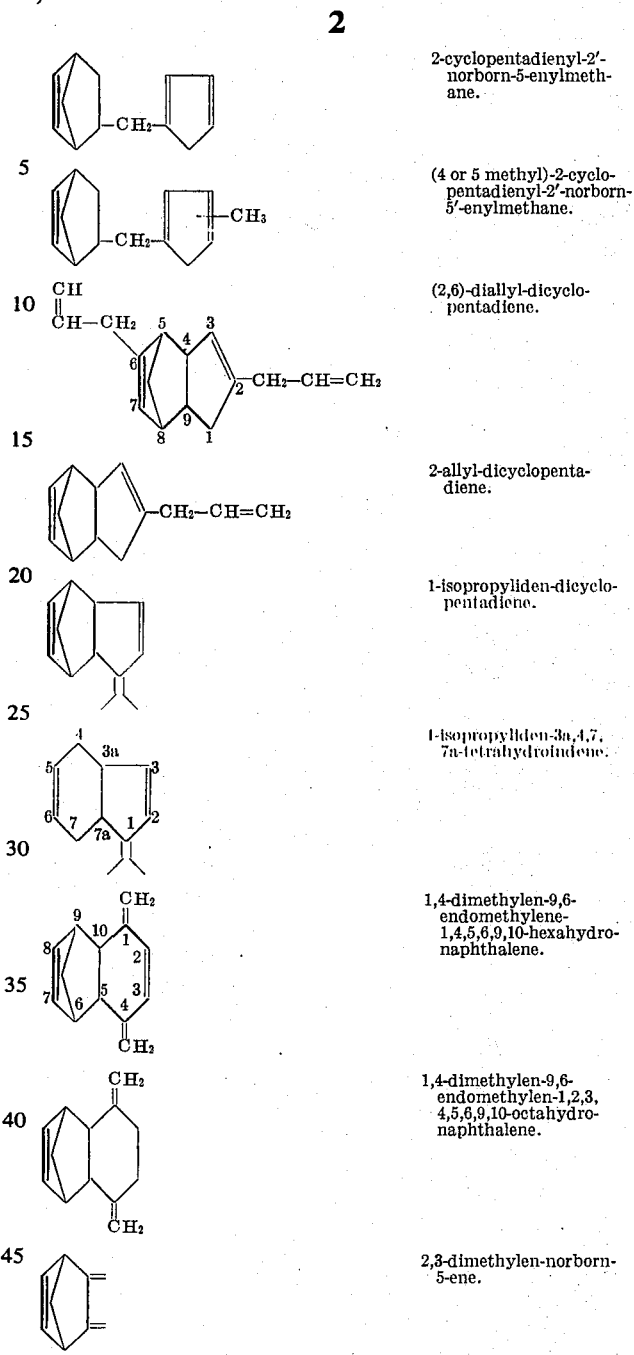

2-methyl-dehydrodi-cyclopentadiene.

2-cyclopentadienyl-2'-norborn-5-enylmethane.

(4 or 5 methyl)-2-cyclopentadienyl-2'-norborn-5'-enylmethane.

(2,6)-diallyl-dicyclopentadiene.

2-allyl-dicyclopentadiene.

1-isopropyliden-dicyclopentadiene.

1-isopropyliden-3a,4,7,7a-tetrahydroindene.

1,4-dimethylen-9,6-endomethylene-1,4,5,6,9,10-hexahydronaphthalene.

1,4-dimethylen-9,6-endomethylen-1,2,3,4,5,6,9,10-octahydronaphthalene.

2,3-dimethylen-norborn-5-ene.

The amount of polycyclic polyene present in the polymer may advantageously be within the range of 0.1 and 10 percent by weight with respect to the whole polymer.

The polymerization reaction is carried out with the known catalyst systems which consist of one or more transition metal compounds from IV to VIII group of the periodic system and reducing compounds of aluminum having the general formula:

$$Al\,R\,X_1\,X_2 \cdot Z_n$$

wherein R is selected among the hydrocarbon radicals having one to 10 carbon atoms of hydrogen; $X_1$ and $X_2$, which may be identical or different, are selected from the same class as R or may be halogens or secondary amine radicals, Z is a Lewis base and $n$ may be 0 or 1. Furthermore the aluminum compound may be a polyimino-alane as described in the Italian Pat. No. 778,353.

The catalyst may be preformed in the presence or not of the monomers or may be prepared "in situ."

The temperatures are those generally employed in this type of reaction or may be in the range between −60° and 100°C.

In the process according to the present invention, the moulding, as aforesaid, is carried out with the apparatus conventionally used for the commercial polyethylenes.

The heating of the moulded polymer is carried out at a temperature between 120° and 300°C preferably between 150° and 240°C.

The residence time at such a temperature should be between 0.5 and 160 minutes.

Some examples of polymerization and subsequent moulding with the process according to the present invention are reported hereinafter; the above examples shall not in any case to be intended as limitative of the invention. In the examples Ac means Acetylacetonate.

Example 1

In a 1 liter reactor, provided a with mechanical stirrer, thermometer, gas inlet and outlet ducts, 250 cm³ of anhydrous n-heptane are introduced under an inert atmosphere. A stream of ethylene at a flow rate of 150 Nl/h is introduced therein while keeping the reactor in a thermostatic bath at 15°C.

Subsequently 3 moles of dehydrodicyclopentadiene, 1 mmole of $Al(C_2H_5)_3$ and 0.5 mmole of $VCl_4$ are introduced therein. With a polymerization time of 6 minutes seven additional mmoles of dehydrodicyclopentadiene are added thereto; at the end 13.0 g of copolymer having the aspect of polyethylene are recovered which show an intrinsic viscosity in decaline at 135°C equal to 11.8 dl/g. The X rays examination showed a high crystallinity of the polyethylene type while the I.R. examination showed absorptions at 890 and 960 cm⁻¹.

The obtained polymer after moulding at 200°C for 60 minutes was subjected to a penetration test with the Vicat needle (ASTM D–1525) having a 1 mm² section, loaded with a 1,000 g weight, the test piece being immersed into a bath whose thermal gradient was 0.8°C/min.

The penetration of the needle was 0.56 mm at the temperature of 138°C, whereas a polyethylene produced by the same catalytic system and having $[\eta]$ = 27 dl/gr had a 3.80 mm penetration.

When the polymer was moulded for 3 minutes at 140°C, an 1.40 mm penetration was observed. Measuring the penetration at 150°C the polymer moulded at 200°C had a 0.72 mm penetration: under these same conditions a high density and high molecular weight polyethylene was completely melted.

This comparison showed that cross-linking of the copolymer had occurred during the moulding operations effected at temperatures higher than 140°C.

Example 2

The above described test was repeated using $(C_2H_5)_2$ Al Cl and methyl-dehydrodicyclopentadiene as comonomer. After 6 minutes of polymerization 9.3 g of copolymer were obtained: it showed $[\eta]$ = 14.2 dl/gr.

The obtained copolymer was moulded under three different conditions: at 140°C for 3 minutes, at 200°C for 30 minutes and at 200°C for 60 minutes.

Proceeding as in Example 1, we recorded the following penetrations at the temperature of 138°C : 1.50, 1.00 and 0.65 mm.

Measuring the penetration at 150°C, the three test pieces, moulded under the above described conditions, showed the following results : 3.40, 1.85 and 1.15 mm.

They showed that the cross-linking reactions increased with increases in the moulding temperature.

Example 3

We proceeded according to Example 1 employing $VAc_3$ — $(C_2H_5)_2$ Al Cl as catalytic system in a molar ratio Al/V = 6.0 at the temperature of 0°C and with 2-cyclopendadienyl-2-norborn 5'-enylmethane as the comonomer. After 8 minutes of reaction 7.5 g of copolymer were obtained, which showed $[\eta]$ = 9.2 dl/gr.

Two test pieces were moulded at 140°C for 3 minutes and at 200°C for 60 minutes; the penetrations were measured at 138°C and at 150°C and gave the following results: 1.20 and 2.82 mm for the first test piece, 1.00 and 2.44 mm for the second test piece.

Example 4

The procedure of Example 1 was repeated using (4 or 5 methyl)-2-cyclopentadienyl-2'-norborn-5'-enyl-methane as the comonomer. After 6 minutes of polymerization 10.0 g of copolymer were obtained : it had $[\eta]$ = 18.5 dl/gr.

Two test pieces were moulded at the temperature of 140°C for 3 minutes and at 200°C for 60 minutes; the penetration was measured at 138°C and 150°C: it was 1.05 and 2.92 mm for the first test piece, 1.02 and 1.74 mm for the second test piece.

Example 5

Employing the apparatus and the procedure of Example 1, the 1-isopropyliden-dicyclopentadiene was used as comonomer. After 5 minutes of reaction we obtained 4.5 g of copolymer showing $[\eta]$ = 18.6 dl/gr.

A test piece, obtained by moulding the produced copolymer at 200°C for 60 minutes, showed an 1.40 mm penetration at 138°C and a 2.70 mm penetration at 150°C.

Example 6

According to the above described procedure we synthesized an ethylene-diallyl-dicyclopentadiene copolymer showing $[\eta]$ = 22.8 dl/gr.

When moulded at 200°C for 60 minutes this copolymer gave a test piece having a 0.90 mm penetration at 138°C and an 1.95 mm penetration at 150°C.

Example 7

An ethylene-allylcyclopentadiene was obtained according to the procedure described in Example 1 using $VO Cl_3$—$(C_2H_5)_3 Al_2 Cl_3$ as catalytic system at 30°C.

After 5 minutes 8.7 g of polymer were obtained, which had $[\eta]$ = 15.5 dl/gr. After being moulded at 200°C for 60 minutes it showed a 2.12 mm penetration at the temperature of 150°C.

What we claim is:

1. A process for obtaining modified polyethylene adapted to cross-linking on the application of heat alone characterized in that the reaction of the ethylene polymerization is carried out in presence of a polycyclic polyene having at least three double bonds in the molecule which is a member of the group consisting of:
2-methyldehydrodicyclopentadiene;
(4 or 5 methyl)-2-cyclopentadienyl-2'-norborn-5'-enylmethane;
2-cyclopentadienyl-2'-norborn-3-enylmethane;
(2,6)-diallyl-dicyclopentadiene;
2-allyl-dicyclopentadiene;
1-isopropyliden-dicyclopentadiene;
1-isopropyliden-3a,4,7,7a-tetrahydroindene;
1,4-dimethylen-9,6-endomethylen-1,2,3,4,5,6,9,10-hexahydronaphthalene;
1,4-dimethylen-9,6-endomethylen-1,2,3,4,5,6,9,10-octahydronaphthalene;
2,3-dimethylen-norborn-5-ene at an ethylene/polyene molar ratio between 1000/1 and 10/1 and in the presence of a catalytic system consisting of one or more transition metal compounds from IV to VIII group of the periodic system and reducing compounds of aluminum having the general formula:

$$Al\, R\, X_1\, X_2 \cdot Z_n$$

wherein R is selected from the group consisting of the hydrocarbon radicals having one to 10 carbon atoms and hydrogen; $X_1$ and $X_2$, equal or different, are selected from the same class as R or may be halogen or secondary amine radicals, Z is a Lewis base, $n$ may be 0 or 1.

2. A process for obtaining a cross-linked modified polyethylene prepared according to the process of claim 1 characterized in that the modified polyethylene after it is formed is subjected to a thermic treatment alone in a temperature range between 120° and 300°C. over a period lasting between 0.5 and 160 minutes.

3. A process for obtaining ethylene-polycyclic polyene copolymers adapted to cross-linking on the application of heat alone and characterized in that the ethylene is polymerized in the presence of a polycyclic polyene selected from the group consisting of:
dehydrodicyclopentadiene;
(4 or 5 methyl)-2-cyclopentadienyl-2'-norborn-5'-enylmethane;
2-cyclopentadienyl-2'-norborn-3-enylmethane;
(2,6)-diallyl-dicyclopentadiene;
2-ally-dicyclopentadiene;
1-isopropyliden-dicyclopentadiene;
1-isopropylidene-3a,4,7,7a-tetrahydroindene;
1,4-dimethylen9,6-endomethylen-1,2,3,4,5,6,9,10-hexahydronaphthalene;
1,4-dimethylen-9,6-endomethylen-1,2,3,4,5,6,9,10-octahydronaphthalene;
2,3-dimethylen-norborn-5-ene, at an ethylene/polyene molar between 1000/1 and 10/1 and in the presence of a catalytic system consisting of one or more transition metal compounds from IV to VIII group of the periodic system and reducing compounds of aluminum having the general formula:

$$Al\, R\, X_1\, X_2 \cdot Z_n$$

wherein R is selected from the group consisting of the hydrocarbon radicals having one to 10 carbon atoms and hydrogen; $X_1$ and $X_2$, equal or different, are selected from the same class as R or may be halogen or secondary amine radicals, Z is a Lewis base, $n$ may may be 0 or 1.

4. A process according to claim 3 characterized in that the aluminum compound is a polyimino-alane.

5. An ethylene-polycyclic polyene copolymer having in its molecule 90.0–99.9 percent by weight of ethylene as monomer units and 0.1–10 percent by weight of a polycyclic polyene having at least three double bonds as monomer units and wherein the polycyclic polyene is a member of the group consisting of:
dehydroicyclopentadiene;
2-methyldehydrodicyclopentadiene;
(4 or 5 methyl)-2-cyclopentadienyl-2'-norborn 5'-enylmethane;
2-cyclopentadienyl-2'-norborn-3-enylemethane;
(2,6)-diallyl-dicyclopentadiene;
2-allyl-dicyclopentadiene;
1-isopropyliden-dicyclopentadiene;
1-isopropyliden-3a,4,7,7a-tetrahydroindene;
1,4-dimethylen-9,6-endomethylene-1,2,3,4,5,6,9,10-hexahydronaphthalene;
1,4-dimethylen-9,6-endomethylen-1,2,3,4,5,6,9,10-octahydronaphthalene;
2,3-dimethylene-norborn-5-ene.

6. An ethylene-polycyclic polyene copolymer as claimed in claim 5 cross-linked by thermic treatment alone.

* * * * *

UNITED STATES PATENT OFFICE
CERTIFICATE OF CORRECTION

Patent No. 3,725,372  Dated April 3, 1973

Inventor(s) Sergio Arrighetti, et al

It is certified that error appears in the above-identified patent and that said Letters Patent are hereby corrected as shown below:

First page after line "[73]" insert the following line:

-- [22] Filed: July 17, 1970 --.

First page, third reference under "References Cited" correct "Valiamori" to read -- Valvassori --.

Column 1, line 54, after "weight" delete -- of --.

Column 2, line 63, after "atoms" change "of" to -- or --.

Column 3, line 23, change "a with" to read -- with a --.

line 29, "moles" should read -- mmoles --.

Column 6, line 1, correct the spelling of "allyl".

line 4, between "dimethylen" and "9" insert a hyphen.

line 16, correct the line to read:

-- $Al \ R \ X_1 \ X_2 \cdot Z_n$ --.

line 32, correct the spelling of

-- dehydrodicyclopentadiene --.

Signed and sealed this 19th day of March 1974.

(SEAL)
Attest:

EDWARD M. FLETCHER, JR.
Attesting Officer

C. MARSHALL DANN
Commissioner of Patents